H. C. RASSMANN.
ELEVATED CONVEYER.
APPLICATION FILED NOV. 18, 1910.
992,386.
Patented May 16, 1911.
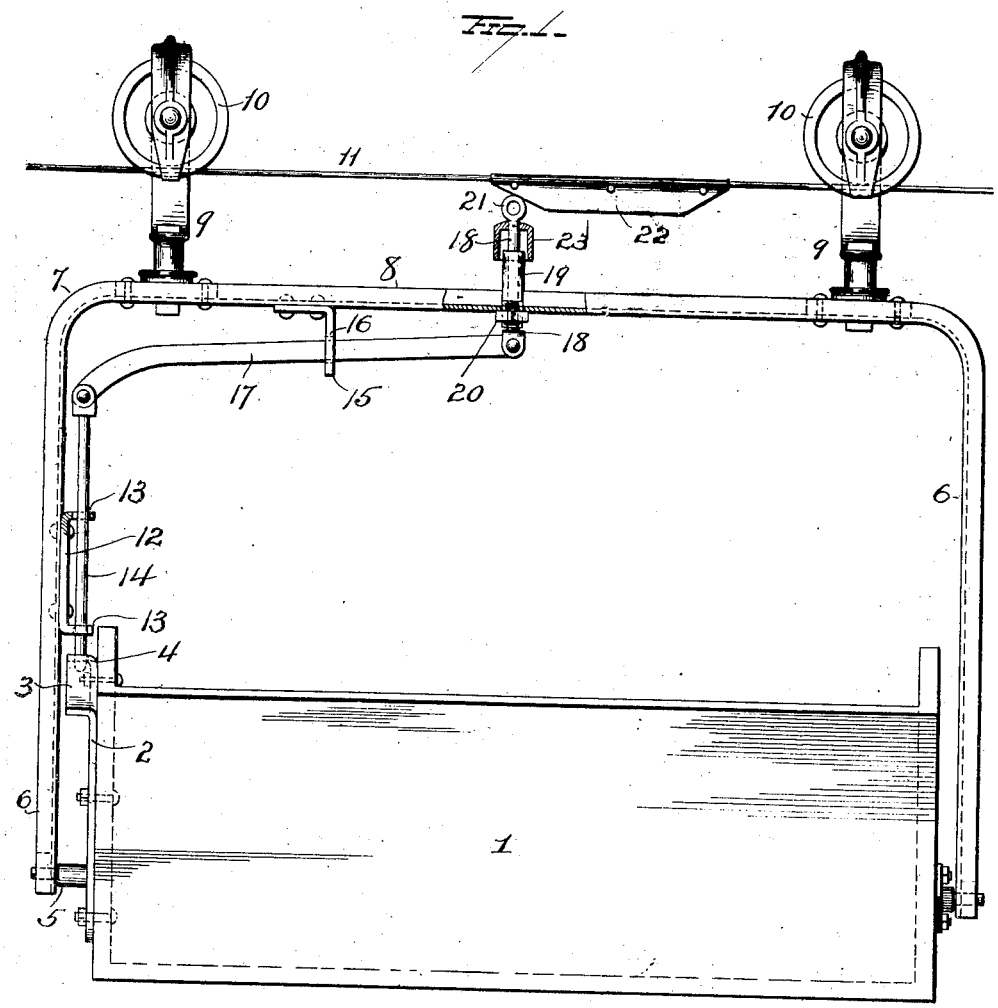
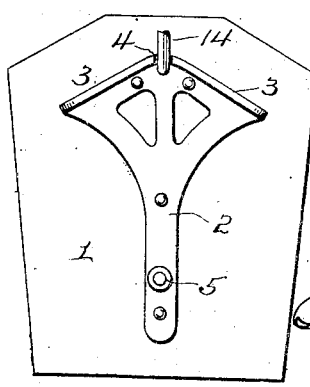
WITNESSES
E. J. Nottingham
G. J. Downing
INVENTOR
H. C. Rassmann
By H. A. Seymour
Attorney

UNITED STATES PATENT OFFICE.

HUGO C. RASSMANN, OF BEAVER DAM, WISCONSIN.

ELEVATED CONVEYER.

992,386.  Specification of Letters Patent.  Patented May 16, 1911.

Application filed November 18, 1910. Serial No. 593,039.

*To all whom it may concern:*

Be it known that I, HUGO C. RASSMANN, of Beaver Dam, in the county of Dodge and State of Wisconsin, have invented certain new and useful Improvements in Elevated Conveyers; and I do hereby declare the following to be a full, clear, and exact description of the invention, such as will enable others skilled in the art to which it appertains to make and use the same.

This invention relates to improvements in elevated conveyers and more particularly to litter carriers,—the object of the invention being to provide simple and efficient means for tripping the pivotally supported receptacle of the device for permitting the same to dump and to so construct the tripping means that their easy, sure and automatic operation shall be assured.

With this object in view the invention consists in certain novel features of construction and combinations of parts as hereinafter set forth and pointed out in the claims.

In the accompanying drawings, Figure 1 is an elevation of a litter carrier embodying my improvements, and Fig. 2 is a detail view.

1 represents a box or receptacle, to one end of which the bracket is secured and said bracket is provided at its upper end with laterally projecting inclined flanges 3,—the flanges 3 being separated at their inner upper ends by a notch 4. A pintle 5 is located at each end of the box or receptacle and serves for the pivotal attachment of the vertical arms 6 of a bail 7 with said box or receptacle. To the upper horizontal member 8 of the bail 7, near the respective ends thereof, hangers 9 are secured and in these hangers wheels 10 are mounted and adapted to run on a rail or wire 11.

A plate 12 is secured to the inner face of one vertical member 6 of the bail and provided at its respective ends with inwardly projecting lugs 13 having holes for the passage of a locking bar 14,—the hole in the upper lug 13 being preferably somewhat elongated so as to permit free movement of the locking bar when the latter is operated as hereinafter explained. The locking-bar 14 is guided in its movements by the perforated lug 13 and is held by the latter a sufficient distance from the bail member to prevent its being frozen to the latter. The lower end of the locking bar 14 enters the notch 4 of bracket 2 and thus normally locks the box or receptacle in position.

An arm 15 depends from the horizontal member 8 of the bail and is provided with an elongated slot 16 for the accommodation of a lever 17,—the slotted arm 15 serving as a fulcrum for said lever. One end of the lever 17 is pivotally connected with the upper end of the locking-bar 14 and to the free end of said lever, a trip-pin or rod 18 is pivoted. The upper horizontal member 8 of the bail is provided centrally between its ends with a hole for the passage of a sleeve or tube 19 having a lower threaded end for the reception of a nut 20. The sleeve 19 is adjustably secured in this way to the bail and projects upwardly from the member 8 of the latter. The trip-pin or rod 18 passes freely through the tube 19 and is provided at its upper end with a head 21 to engage a trip arm or plate 22 attached to the track or wire 11 and provided at its respective ends with beveled portions. A hood 23 is secured to the trip-pin or rod 18 a short distance below the head of the latter and embraces the upper portion of the sleeve 19 so as to prevent the entrance of moisture into the latter, whereby the freezing or sticking of the trip-pin or rod in the guiding tube 19 will be avoided.

It is apparent that, during the travel of the carrier and the engagement of the trip-pin or rod 18 with the trip-arm or plate 22, said trip-pin or rod will be depressed, causing the lever 17 to turn on its fulcrum and raise the rod or bar 14 out of engagement with the notch 4 of bracket 2 on the box or receptacle and thereby release the latter so as to permit it to dump.

Having fully described my invention what I claim as new and desire to secure by Letters-Patent, is,—

1. An elevated carrier comprising a bail, a receptacle pivotally supported therein and provided with a notched member, a locking bar to coöperate with said notched member, a perforated guide plate on the bail for said locking bar and spaced from the bail, an arm depending from the top member of the bail and provided with a vertical elongated slot, a lever passing freely through the slot in said depending arm and pivotally connected at one end with the locking bar, a trip-pin pivotally attached to the other end of said lever, and a guide tube for said trip-pin secured to the top member of the bail.

2. An elevated carrier, comprising a bail, a receptacle pivotally supported therein, a locking-bar mounted on the bail and coöperating with said receptacle to hold the latter normally fixed within the bail, a lever pivotally supported by the bail and attached to said locking-bar, a guide tube secured to the top member of the bail, a trip-pin attached to said lever and passing through said guide-tube, and a hood carried by said trip-pin and embracing the upper portion of said guide-tube.

In testimony whereof, I have signed this specification in the presence of two subscribing witnesses.

HUGO C. RASSMANN.

Witnesses:
WILLIAM WILLIAMSON,
ELMER J. LAWRENCE.